US009890665B2

(12) United States Patent
Carroni et al.

(10) Patent No.: US 9,890,665 B2
(45) Date of Patent: Feb. 13, 2018

(54) POWER PLANT WITH SOLAR ENERGY SYSTEM

(71) Applicant: ALSTOM Technology Ltd, Baden (CH)

(72) Inventors: Richard Carroni, Niederrohrdorf (CH); Christoph Ruchti, Uster (CH); Joerg Dietzmann, Baden (CH)

(73) Assignee: General Electric Technology GmbH, Baden (CH)

( * ) Notice: Subject to any disclaimer, the term of this patent is extended or adjusted under 35 U.S.C. 154(b) by 964 days.

(21) Appl. No.: 13/913,931

(22) Filed: Jun. 10, 2013

(65) Prior Publication Data

US 2013/0327051 A1 Dec. 12, 2013

(30) Foreign Application Priority Data

Jun. 12, 2012 (EP) ..................................... 12171600

(51) Int. Cl.
*F01K 23/10* (2006.01)
*F03G 6/00* (2006.01)
(Continued)

(52) U.S. Cl.
CPC ................ *F01K 23/10* (2013.01); *F02C 1/04* (2013.01); *F02C 7/143* (2013.01); *F03G 6/00* (2013.01); *Y02E 10/46* (2013.01); *Y02E 20/16* (2013.01)

(58) Field of Classification Search
CPC ...... F02C 7/10; F02C 7/08; F02C 1/05; Y02E 10/46; Y02E 20/16; Y02E 20/14
See application file for complete search history.

(56) References Cited

U.S. PATENT DOCUMENTS 4,951,460 A * 8/1990 Prochaska ................. F02C 7/04
60/39.511
5,042,246 A * 8/1991 Moore .................... F01D 19/00
60/39.182
(Continued)

FOREIGN PATENT DOCUMENTS

DE 19627425 A1 1/1998
EP 0 378 003 7/1990
(Continued)

OTHER PUBLICATIONS

European Search Report dated Nov. 22, 2012 for EP12171600.5.

*Primary Examiner* — Pascal M Bui Pho
*Assistant Examiner* — Stefan Ibroni
(74) *Attorney, Agent, or Firm* — Dority & Manning, P.A.

(57) ABSTRACT

A power plant (1) that includes at least one of a gas turbine (GT), a steam turbine (ST) with a water-steam cycle, and a heat recovery steam generator (B) operatively connected to a heat generating member such as solar energy system ($S_{solar}$) by means of a primary circuit (10a, 10b, 10c) and a secondary circuit system (20a). The primary heat transfer circuit (10a, 10b) includes solar heating system ($S_{solar}$) configured to heat a primary fluid (10), and the secondary circuit (20a) comprises a flow line (20A) for a secondary flow (20) and a main heat exchanger (23) to exchange heat between the secondary water flow and a gas turbine inlet air flow (2). A first line (10B) in the primary circuit (10b) leads to a first heat exchanger (12) to heat the water flow in the secondary circuit (20a).

9 Claims, 1 Drawing Sheet

(51) Int. Cl.
F02C 1/04 (2006.01)
F02C 7/143 (2006.01)

(56) References Cited

U.S. PATENT DOCUMENTS

| | | | |
|---|---|---|---|
| 5,669,217 A * | 9/1997 | Anderson | F02C 7/1435 60/39.53 |
| 6,000,211 A | 12/1999 | Bellac et al. | |
| 6,578,352 B2 * | 6/2003 | Morikawa | F01K 23/108 60/39.182 |
| 7,644,573 B2 | 1/2010 | Smith et al. | |
| 2010/0146976 A1 | 6/2010 | Motakef et al. | |
| 2011/0088399 A1 | 4/2011 | Briesch et al. | |

FOREIGN PATENT DOCUMENTS

| | | |
|---|---|---|
| EP | 2 196 651 | 6/2010 |
| GB | 2364553 | 1/2002 |
| GB | 2449181 | 11/2008 |

* cited by examiner

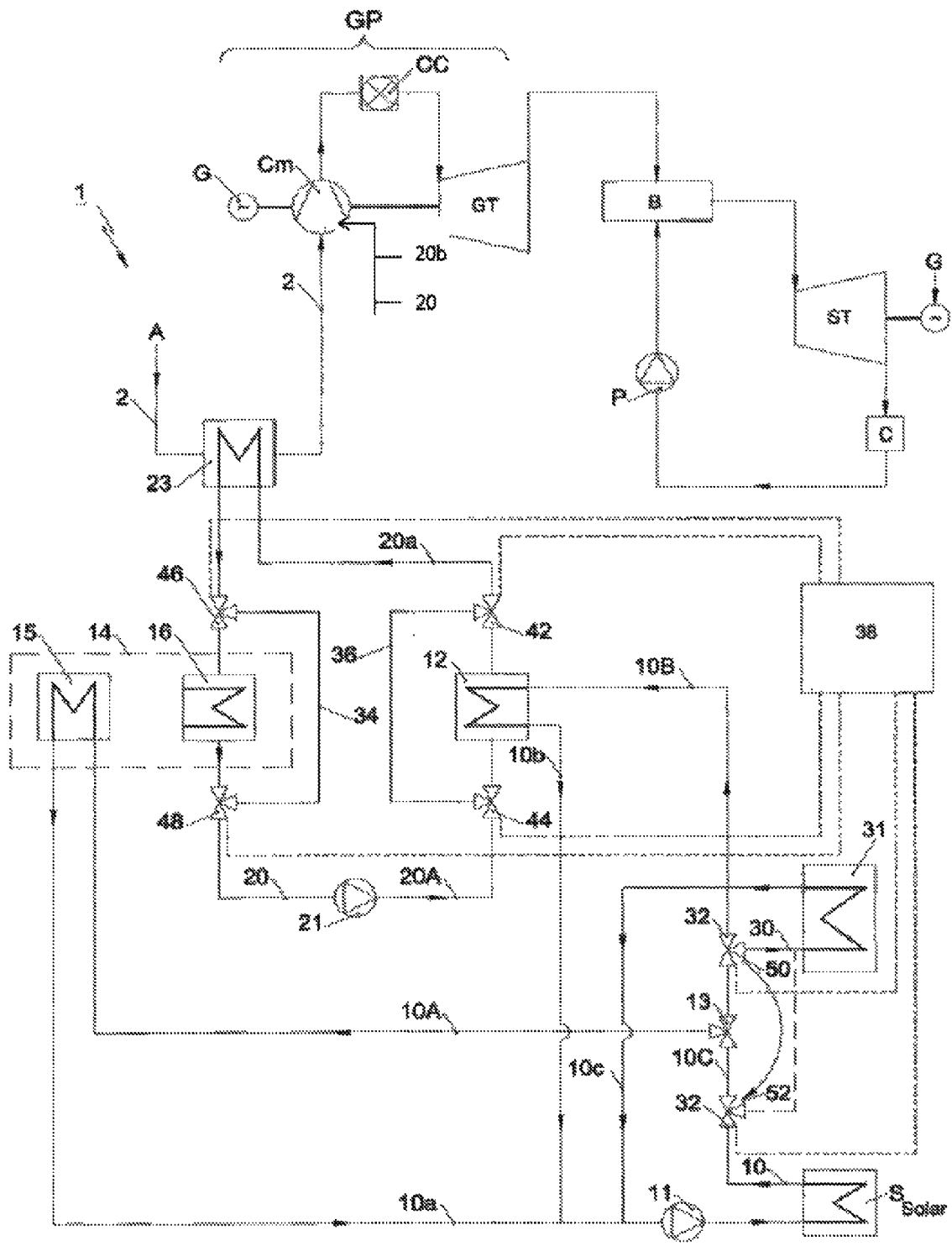

POWER PLANT WITH SOLAR ENERGY SYSTEM

CROSS-REFERENCE TO RELATED APPLICATION

This application claims priority to European Patent Application Serial No. 12171600.5; filed on Jun. 12, 2012, entitled "POWER PLANT WITH SOLAR ENERGY SYSTEM" which is incorporated herein by reference in its entirety.

TECHNICAL FIELD

The invention pertains to a method of operating a power plant for the generation of electricity, and in particular a method of operating a combined cycle power plant with a heat generating source particularly solar energy system. The invention furthermore pertains to a power plant operable by the method.

BACKGROUND ART

Conventional power plants for the generation of electrical energy such as combined cycle power plants can be operated in combination with renewable energy sources in order to reduce the $CO_2$ emissions for a given electric power production. When renewable energy sources such as wind or solar energy are available and made to contribute to the electrical power production, a fossil fuel fired combined cycle power plant can be operated at part-load and still produce the full electric power. However, the efficiency of a combined cycle power plant during its part load operation is typically less than its efficiency at full load. The specific $CO_2$-emissions at part-load operation of the combined cycle power plant are then increased, and the reduction in $CO_2$ emissions due to the implementation of renewable energy sources is again diminished.

DE19627425 discusses a combined cycle power plant, where feed water of the water-steam cycle of the steam turbine is led into a solar steam generator and the resulting solar steam is added to steam generated by the heat recovery steam generator of the power plant. The mixture of the two steam flows is superheated for use in the steam turbine. During operation using the solar steam generator only, preheated feedwater is led into the solar generator and the steam generated there is led directly to the steam turbine.

US Patent number US2009/0235634 discusses a system that allows extending the turndown range of a turbomachine during partload operation. The turndown range is defined there as the loading range of the machine, within which the machine operates while maintaining emissions compliance. The extension of the partload operation turndown range is realized by the use of a heat source external to the turbomachine, such as solar heat, for the preheating of inlet air to the compressor of the turbomachine. The preheating of the inlet air results in a higher temperature of the air exiting the compressor and entering the combustion chamber. Effectively, less fuel is then needed to reach a necessary firing temperature of the gas turbine.

GB2449181 discusses a power plant comprising a gas turbine and a solar hybrid cycle, where heat provided to air after the gas turbine compressor and prior to the combustion process is supplied by direct solar heat. The heating of the air is realized by direct heat transfer from solar radiation to the air generating high air temperatures above 350° C. The concept allows for higher temperatures at which energy is extracted from the thermodynamic cycle of the gas and steam turbines yielding a higher power output and greater cycle efficiency.

SUMMARY OF INVENTION

In accordance with an exemplary embodiment, a method with improved part load as well as high load operation is provided for operating a power plant for the generation of electricity comprising a gas turbine, steam turbine and that is integrated with a heat generating member.

An aspect provides a method for operating a power plant comprising, heating a primary fluid by a heat generating member, operatively connected with a gas turbine, a steam turbine and a heat recovery steam generator, and directing the heated primary fluid to at least one of a plurality of primary circuits during a part load operation and a high load operation. During part-load operation, the heated primary fluid is directed through the primary circuit to a heat exchanger to direct the heat to a secondary fluid for transferring the heat to a main heat exchanger for heating gas turbine inlet air, while during high load operation the heated primary fluid is directed through the primary circuit to a heat exchanger for transferring the heat to power an absorption chiller for cooling the secondary fluid, and directing the secondary fluid to the main heat exchanger for cooling gas turbine inlet air by the main heat exchanger.

Typically, the secondary fluid used to heat the gas turbine inlet air during part load operation and to cool the gas turbine inlet air during high load operation is circulated in a single closed circuit containing the main heat exchanger arranged for heat exchange between the secondary fluid and the gas turbine inlet air, the heat exchanger to heat the secondary fluid, and the absorption chiller (system) to cool the secondary fluid. The heat generating member can be a solar energy source or any other similar sources. The method achieves a reduction of $CO_2$ emissions as well as an increase in the overall performance of the power plants for example combined cycle power plant, both during part-load operations and high-load operation. During the part-load operations, the increased inlet air temperatures to the gas turbine or turbines effects an efficiency increase of the combined cycle power plant, while at high load the operation of the heat exchanger for heating the inlet air is turned off, and the solar steam is used to power an absorption chiller to cool the secondary fluid, which in turn cools the inlet air during high-load operation. Thereby, the steam mass flow otherwise extracted from the steam turbine or heat recovery steam generator for heating purposes can be fully utilized to drive the steam turbine. Consequently, more power is generated.

The method according to an exemplary embodiment of the disclosure enables the supply of energy for example solar thermal energy to two different heat exchange processes using one single secondary fluid heat exchange circuit, where both processes increase power plant performance and the entire load range is covered.

The method according to an exemplary embodiment of the disclosure has therefore the further advantage that it can be performed utilizing one heat generating member such as single solar installation supplying heat to different power plant processes and serving the entire load range of the power plant. Moreover, the solar heat may be supplied to the absorption chiller and to the inlet air using existing heat exchangers provided for cooling and heating the secondary fluid to cool or heat the inlet air. Thereby, the method may be realized by retrofitting an existing power plant installation at limited investment costs.

The method typically utilizes the single secondary circuit and only one heat exchanger to perform both cooling and heating functions over different load operations covering entire load range.

In an exemplary method, during operation of the power plant at any load, part of the heat generating member such as solar energy system is used to supply heat to feed water for the water-steam cycle of the power plant. In particular, part or all of the solar steam can be used to heat the feed water in the power plant instead of high-quality pegging steam extracted from a turbine.

Supplying the feed water with solar heat is furthermore particularly advantageous in the case when sulfur-containing fuels are used for operating the gas turbine. Such fuel requires higher feed water temperatures in order to prevent stack corrosion by increasing stack gas temperatures. In such case, the supply of solar heat allows a significant reduction of the steam mass flow extraction thereby increasing plant performance.

The primary fluid can be heated to temperatures in the range of for example 90-120° C. to preheat the inlet air to the gas turbine by temperatures of up to 25° C. or more, or to cool the inlet air to the gas turbine by temperatures of up to 15° C. or more.

An increase in the air inlet temperature at part load by approximately 20° C. may result in an improvement of the relative combined cycle efficiency from 0.945 to 0.954 while the part-load efficiency can be increased by 0.5%.

In an embodiment of the method according to the disclosure, a primary fluid heated by the heat generating member such as solar energy system is directed through the at least one of a primary circuit containing a feed water heater. A movable valve permits varying, at any load, the portion of solar energy used in the feed water heater and further in the heat recovery steam generator. The portion may range up to complete use of solar energy.

In addition to the method to operate a power plant, an exemplary embodiment provides a power plant capable of performing exemplary methods. The power plant comprises a heat generating member for heating a primary fluid in at least one primary circuit. The heat generating member is operatively connected with at least one of a gas turbine, a steam turbine, a heat recovery steam generator, and a water-steam cycle with a condenser.

The heat generating member is part of the at least one primary circuit, which is connected to a secondary circuit, where the at least one primary circuit comprises a first flow line leading from the heat generating member to a first heat exchanger and a flow line back to the heat generating member where the first heat exchanger is arranged for heat exchange with a secondary fluid in the secondary circuit. The primary circuit comprises a second flow line leading from the heat generating member to a second heat exchanger and back to the heat generating member, and where the second heat exchanger is arranged to power an absorption chiller which in turn is arranged for heat exchange with the secondary flow in the secondary circuit and the secondary circuit comprises a main heat exchanger arranged in the line for heat exchange with the inlet air flow of the gas turbine over an entire plant load.

In particular, the primary circuit comprises a solar energy system and a first line for the primary fluid flow leading to a first heat exchanger to heat the secondary fluid in the secondary circuit. A second line leads from the solar energy system to a second heat exchanger arranged to power an absorption chiller, which in turn is arranged to cool the flow in the secondary circuit. The secondary circuit comprises a line for the secondary fluid flow, a main heat exchanger arranged in the inlet airflow of the gas turbine, the first and second heat exchangers.

In an exemplary embodiment, the first and second lines from the primary circuit comprise valves that allow the control of the solar heated primary fluid according to the operation load of the power plant and to the degree of insolation at the power plant site.

The heating of the primary fluid to such temperatures can be fulfilled by a solar energy system such as, a solar field comprising non-concentrating solar elements such as planar elements, and slightly concentrating solar units. Planar, non-concentrating solar panels suffice to generate temperatures of, for example, up to 90° C.-120° C., which is sufficient to operate the heat exchanger for heating the inlet air heating as well as for powering the absorption chiller for cooling the air, may be used. The concentrating solar units generate higher temperatures and provide higher cooling/heating during the operation. The primary fluid may attain temperatures around 200° C. or more. As such, a solar energy system based on direct solar heating is suitable.

BRIEF DESCRIPTION OF THE DRAWINGS

FIG. 1 shows a schematic of an exemplary power plant of an embodiment of the invention that integrates a heat generating member such as solar energy system so as to be capable to perform exemplary methods.

DETAILED DESCRIPTION

FIG. 1 shows a schematic layout of an embodiment of a power plant 1 for the generation of electricity. The power plant 1 comprise a gas turbine plant GP having a compressor Cm, which compresses ambient air A directed to it via line 2, a combustion chamber CC and a gas turbine GT, which expands combusted fuel and drives a generator G. A line is provided to direct the gas exhausted by the gas turbine GT to a heat recovery steam generator B, which utilizes the hot exhaust gas turbine gases to generate steam for a steam turbine ST. A water steam cycle of the power plant comprises a condenser C, condensate preheaters, a feed water pump P, and feed water preheaters, from where the feed water is directed back to the heat recovery steam generator B. In an exemplary embodiment, the power plant 1 is a combined cycle power plant.

The power plant 1 is operatively connected to a heat generating member such as solar energy system $S_{solar}$ by means of primary circuits 10a, 10b, 10c and a secondary circuit 20a.

The heat generating member, such as a solar energy system $S_{solar}$ integrated with the combined cycle power plant 1, comprises a plurality of solar elements such as planar solar elements for the heating of a primary fluid 10 such as water, demineralized water or oil circulating in a single installation of the primary heat exchange circuits 10a, 10b, 10c. The solar energy system $S_{solar}$ is laid out to generate either hot water or fluid or steam in the single installation of primary heat exchange circuits 10a, 10b, 10c. A pump 11 is provided to pump the primary fluid 10 through the primary circuits 10a, 10b and 10c.

Both primary circuits 10a, 10b with the solar energy system $S_{solar}$ provide the heat through the primary fluid 10 for the heating or cooling of the inlet air A directed to the compressor Cm of the gas turbine. For this, the primary circuits 10a and 10b are connected, via a heat exchanger 15 or 12 respectively, to the secondary circuit 20a, which comprises a pump 21 and a main heat exchanger 23 configured for heat exchange between a secondary fluid 20, for example, water, demineralized water or oil circulating in the secondary circuit 20a and the inlet airflow in line 2.

As shown in FIG. 1, a primary circuit 10a is connected to the heat exchanger 15 arranged to power within an absorption chiller 14, which is arranged to cool the secondary fluid 20 in the secondary circuit 20a. The secondary circuit 20a in turn directs the secondary fluid 20 in line 20A to the main heat exchanger 23, which cools the inlet airflow in line 2.

As shown in FIG. 1 a primary circuit 10b is connected to the heat exchanger 12 which is also arranged in the secondary circuit 20a for heat transfer to the same secondary fluid 20 in the line 20A. The heat exchanger 12 is arranged to heat the secondary fluid 20. In this case, the secondary fluid 20 in the secondary circuit 20a is heated and when directed to the main heat exchanger 23, transfers heat to the inlet air in line 2.

In an exemplary embodiment, the secondary fluid 20 is circulated in the secondary circuit 20a for heat exchange in the main heat exchanger 23 over the entire load range. In an exemplary embodiment a primary circuit 10c configured with the solar energy system $S_{solar}$ is connected with a heat exchanger 31 arranged for energy exchange with a water steam cycle for example for heating feed water.

In an exemplary embodiment, a first regulator member 34 is arranged with a heat exchanger 16 and a second regulator member 36 is arranged with the heat exchanger 12 in the secondary circuit 20.

A controlling module 38 configured with primary circuits 10a, 10b and 10c for controlling the primary fluid 10 such as water, demineralized water or oil circulating in the single installation of primary heat exchange circuits 10a, 10b, 10c.

The controlling module 38 has a microcontroller with inbuilt memory, a signal conditioner and a motor controller. The microcontroller receives signals via the signal conditioner, which are connected to various sensors (not shown) attached in the in the single installation of primary heat exchange circuits 10a, 10b, 10c and in the power plant 1 and the water steam cycle.

The control module 38 receives input signals from environmental sensors (not shown) representing ambient temperature and pressure, amount of solar radiations received by the solar energy system $S_{solar}$. The control module 38 also receives input signals from sensors (not shown) for fuel classification inside the combustion chamber, temperature and pressure inside the primary heat exchange circuits 10a, 10b, 10c, power plant 1 and the water steam cycle together with a signal representing the demand for power.

Based on the plant load determined by the sensor (not shown), A valve 13 controlled through the controlling module 38 supply the primary fluid 10 to be directed to either one of the two primary circuits 10a or 10b. The valve (13) arranged in the lines (10A, 10B) of the primary circuit (10a, 10b) for controlling the flow of a primary fluid (10) according to the operation load of the power plant 1.

The valve (13) allows to switch from an operation of the heating the inlet air (2) during part-load operation to an operation of cooling the inlet air (2) during high-load operation of the power plant (1). Depending on the plant load, the airflow in line 2 will be cooled or heated by the secondary fluid 20 in the secondary circuit 20a.

The secondary fluid (20) is passed through the plurality of regulator member (34, 36) in the secondary circuit (20a). The secondary fluid (20) may be heated or cooled according to the operation load of the power plant. The control module (38) controls the plurality of regulator member (34, 36) in the secondary circuit (20a) over the entire plant load range.

The line 10A in the primary circuit 10a leads to the absorption chiller 14 having the first heat exchanger 15 and the second heat exchanger 16, which are configured and arranged to cool the secondary fluid 20 in the secondary circuit 20a. During high-load operation of the power plant 1, valve 13 is set to allow the primary fluid 10 to flow through circuit 10a thereby activating the absorption chiller operation. The secondary fluid 20 in the secondary circuit 20a will be cooled for example to a temperature of 0-15° C. The secondary fluid 20 in the secondary circuit 20a flows through the second regulator member 36 avoiding the heat exchanger 12. By transferring heat to the secondary fluid 20 in the main heat exchanger 23, the inlet air will reach for example temperatures of 5-10° C. allowing a greater power output and with reduced CO2 emissions. These temperatures are based on an ambient temperature for example around 15° C. sensor (not shown) sensing the flow in the primary circuit 10a provides signals to the control module 38, which regulates the flow through the second regulator member 36 through control valve 42,44. Alternatively, the inlet air may be intercooled at various stages of the compressor.

In one embodiment of the disclosure, the cooling of the inlet airflow A is realized by indirect non-contact cooling by heat exchange. In a further alternative of the disclosure, the cooling of the inlet air A or compressor air at compressor interstages may be realized by means of direct contact cooling, i.e. direct injection 20b of the secondary fluid 20 into the airflow A.

During part load operation of the plant, the valve 13 is set to allow the primary fluid 10 to flow in the primary circuit 10b. The secondary fluid 20 in the secondary circuit 20 will be heated to preheat the inlet air A to the gas turbine GT for example by temperatures of up to 25° C. or more. The secondary fluid 20 flow through the first regulator member 34 avoiding the heat exchanger 16. The heating of inlet air A allows a greater power output with reduced CO2 emissions. Sensor (not shown) sensing the flow of primary fluid 10 in the primary circuit 10b provides signals to the control module 38, which regulates the flow of secondary fluid 20 through the first regulator member 34 through control valve 46, 48.

The cooled secondary fluid (20) is passed through the second regulatory member (36) avoiding the heat exchanger (12) at high load and at part load the heated secondary fluid (20) passed through a first regulatory member (34) avoiding the heat exchanger (16) thereby covering the entire plant load range.

During part-load operation the heating of the inlet airflow A is done by means of secondary fluid 20 flowing through the secondary circuit 20a and through hot primary fluid 10 flowing in the primary circuit 10b, some of the flow of the primary fluid 10 in the primary circuit 10b having a temperature of approximately 90° C. may be diverted into the primary circuit 10c via a line 30 originating from a movable valve 32, which leads through the heat exchanger 31 configured and arranged for the preheating of feed water. The line 30 further connected to the pump 11 in the primary circuit 10c. This method allows the use of solar heat to support the feed water heating and, allows reduced usage of pegging steam extracted from the steam turbine ST.

The movable valve 32 is movable to another position 52 from the earlier position 50 as indicated in FIG. 1 where some of the flow of the primary fluid 10 in the primary circuit 10a having a temperature of approximately 90° C. may be diverted to into the primary circuit 10c via line 30 through the movable valve 32 to the heat exchanger 31 thus covering the entire plant load range and allowing the use of solar heat to support the feed water heating and, for example, allows reduced usage of pegging steam extracted from the steam turbine ST. The saving of pegging steam is calculated over the entire load range by measuring the amount of primary fluid 10 diverted to the feed water heater 31 through the movable valve 32 over the entire load range, supply of solar heat allows a significant reduction of the steam mass flow extraction thereby increase the plant performance.

In an exemplary embodiment, a fuel classification sensor (not shown) in the combustion chamber provides information regarding the amount of sulfur content in the fuel used. Based on these signals, the primary circuits 10a, 10b and 10c provides the solar heat to support the feed water heating and allows, in one exemplary embodiment, reduced usage of pegging steam extracted from the steam turbine ST or, in another exemplary embodiment, the usage of no pegging steam. This elimination of the use of pegging steam is achieved by providing total solar heat to feed water heating, thereby covering the whole plant range.

The primary fluid 10 in primary circuits 10b, 10c is heated to temperatures in the range of 90-120° C. to preheat the inlet air A in the range of 25° C. or more or else to cool the inlet air A in the range of 15° C. or more.

The first regulator member 34 and the second regulator member 36 reduces unnecessary pressure losses, since the secondary fluid 20 only has to flow through one heat exchanger 12 or 16 depending upon the plant load and reduces unnecessary heat transfer as mixing of the secondary fluid 20 during different applications e.g. at high load, the cooled secondary fluid 20 can be avoided from being heated by the heat exchanger 12 and at part load the heated secondary fluid 20 be avoided from being cooled by the heat exchanger 16. Based on increasing/decreasing power plant load, the first regulator member 34 and the second regulator member 36 are controlled, for heating and cooling of the inlet air A during the part load and high load condition respectively, thereby covering the whole plant range.

Based on the plant load determined by the sensor, for example part load 10%-70%, high load 70%-100% and full load 100%, the single installation of primary heat exchange circuits 10a, 10b, 10c along with the single source of solar energy system supply thermal energy to three different process, thereby covering the whole plant load range.

The three primary circuits 10a, 10b and 10c may work separately or in combination to increase the operational flexibility. Solar energy is used at part load and at high load, whereby the solar energy serves to preheat gas turbine GT inlet air at part load and to complement feed water preheating at high load.

In an exemplary embodiment, a single solar field is utilized to generate solar heat for all different performance enhancing applications as well as improving power plant 1 performance at the entire plant load range. Also, the single solar field has the ability to supply solar heat both at times of relatively intense solar radiation and at times of diminished solar radiation, in order to supply peak power demands which do not occur simultaneously.

Already existing heat exchangers which are employed for anti-icing may be used. Indeed, in and exemplary embodiment, solar heat is added via existing air preheater, thereby obviating the need for new heat exchangers. Furthermore, in such an arrangement, the air-preheating duty can be shared between the solar energy system and the water steam cycle at similar water pressure level, which allows for maximum flexibility. Various solar energy collection devices can be used, for example, solar panels, parabolic trough collectors, flat plate collectors and other similar devices. The temperatures can be influenced by ambient conditions, types of fuel, and operating conditions and the process in the disclosure.

The gain due to fuel cost savings are expected to outweigh the investment costs over the life time cycle of the power plant. Considering the power plants operate at part loads and if fossil fuel prices rise further over the lifetime of a power plant the gain is even higher during lower part loads operations.

The foregoing descriptions of specific embodiments of the present disclosure have been presented for purposes of illustration and description. They are not intended to be exhaustive or to limit the present disclosure to the precise forms disclosed. Many modifications and variations are possible in light of the above teaching. The embodiments were chosen and described in order to best explain the principles of the present disclosure and its practical application so as to enable those skilled in the art to best utilize the present disclosure and various embodiments with various modifications as are suited to the particular use contemplated. It is understood that various omission and substitutions of equivalents are contemplated as circumstance may suggest or render expedient, but as such are intended to cover the application or implementation without departing from the scope of the claims of the present disclosure. Nonetheless, the scope of the invention is indicated by the appended claims rather than the foregoing description.

The invention claimed is:

1. A method for operating a power plant, the power plant comprising a compressor, a gas turbine, a steam turbine, and a heat recovery steam generator, the method comprising:
   directing gas exhausted by the gas turbine to the heat recovery steam generator,
   the heat recovery steam generator utilizing the gas exhausted by the gas turbine to generate steam,
   running a water steam cycle of the power plant through the neat recovery steam generator, wherein the water steam cycle of the power plant comprises a main feed water,
   heating a primary fluid by a solar energy system, creating a heated primary fluid; and
   directing, via a valve, the heated primary fluid from the solar energy system through at least one primary circuit during a part load operation and a high load operation, wherein, during the part-load operation, the valve directs the heated primary fluid from the solar energy system through the at least one primary circuit to a first heat exchanger to direct heat to a secondary fluid for transferring the heat to a main heat exchanger for heating gas turbine inlet air upstream of the compressor and the gas turbine inlet air being supplied to the compressor, and
   wherein, during the high-load operation, the valve directs the heated primary fluid from the solar energy system through the at least one primary circuit to a second heat exchanger for transferring the heat to power an absorption chiller for cooling the secondary fluid and directing the secondary fluid to the main heat exchanger for cooling the gas turbine inlet air upstream of the compressor and the gas turbine inlet air being supplied to the compressor.

2. The method according to claim 1, wherein cooling of compressor air is realized directly, at one or more interstages of the gas turbine compressor, by means of direct contact cooling and cooling of the inlet air is realized indirectly by means of indirect, non-contact cooling in the main heat exchanger.

3. The method according to claim 1, further comprising controlling a flow of the primary fluid in the at least one primary circuit according to an operation load of the power plant.

4. The method according to claim 1, further comprising circulating the secondary fluid in a secondary circuit for heat exchange in the main heat exchanger over an entire load range.

5. The method according to claim 4, further comprising: passing the secondary fluid through a plurality of regulator members in the secondary circuit;
heating the secondary fluid during the part load operation or cooling the secondary fluid during the part high load operation; and controlling the plurality of regulator members in the secondary circuit through a control module over the entire load range.

6. The method according to claim 5, further comprising passing the cooled secondary fluid through a second regulatory member so as to avoid the first heat exchanger at the high load operation while at the part load operation passing the heated secondary fluid through a first regulatory member so as to avoid the second heat exchanger thereby covering the entire plant load range.

7. The method according to claim 1, further comprising:
diverting a part of the heated primary fluid to a solar energy system feed water heater through a movable valve;
heating the feed water over an entire plant load range; and
eliminating the usage of pegging steam extracted for pre heating the solar energy system feed water in a water steam cycle over the entire plant load range.

8. The method according to claim 1, further comprising heating the primary fluid in the at least one primary circuit to temperatures in a range of 90-120° C. so as to preheat the inlet air in a range of 25° C. or more or to cool the inlet air in the range of 15° C. or more.

9. The method according to claim 1, wherein the solar energy system comprises a single solar energy source over an entire plant load range.

* * * * *